United States Patent
Oike et al.

(10) Patent No.: US 8,950,429 B2
(45) Date of Patent: Feb. 10, 2015

(54) VALVE-MEMBER MONITORING SYSTEM

(75) Inventors: Tadashi Oike, Hyogo-ken (JP);
Mamoru Nagase, Hyogo-ken (JP)

(73) Assignee: TLV Co., Ltd., Hyogo-Ken (JP)

( * ) Notice: Subject to any disclaimer, the term of this patent is extended or adjusted under 35 U.S.C. 154(b) by 406 days.

(21) Appl. No.: 12/804,671

(22) Filed: Jul. 26, 2010

(65) Prior Publication Data

US 2011/0036424 A1 Feb. 17, 2011

(30) Foreign Application Priority Data

Aug. 12, 2009 (JP) ................................. 2009-187508
Jun. 15, 2010 (JP) ................................. 2010-136524

(51) Int. Cl.
*E03B 1/00* (2006.01)
*F16K 11/22* (2006.01)
*F16T 1/48* (2006.01)
*F16K 37/00* (2006.01)

(52) U.S. Cl.
CPC ............... *F16T 1/48* (2013.01); *F16K 37/0075* (2013.01)
USPC ............................ 137/606; 137/554; 137/883

(58) Field of Classification Search
CPC .................................................. G05B 19/0423
USPC ............ 137/883, 554, 557, 606, 558; 62/150, 62/272, 285
See application file for complete search history.

(56) References Cited

U.S. PATENT DOCUMENTS

| | | | | |
|---|---|---|---|---|
| 3,355,728 A | * | 11/1967 | Smith | 137/554 |
| 5,438,714 A | * | 8/1995 | Shaw | 4/664 |
| 6,701,287 B2 | * | 3/2004 | Nagase | 702/188 |
| 6,725,179 B1 | * | 4/2004 | Nagase | 702/188 |
| 7,246,036 B2 | * | 7/2007 | Cheskaty et al. | 702/183 |
| 2005/0087235 A1 | * | 4/2005 | Skorpik et al. | 137/554 |
| 2006/0278281 A1 | * | 12/2006 | Gynz-Rekowski et al. | 137/554 |
| 2008/0150737 A1 | * | 6/2008 | Karschnia | 340/605 |
| 2008/0270047 A1 | * | 10/2008 | Quake et al. | 702/50 |

* cited by examiner

*Primary Examiner* — John Rivell
*Assistant Examiner* — Angelisa Hicks
(74) *Attorney, Agent, or Firm* — Kenyon & Kenyon LLP

(57) ABSTRACT

Construction of a valve-member monitoring system using wireless communication is facilitated. The valve-member monitoring system is structured with operating-condition sensors each attached to each of multiple steam traps installed on a manifold. The manifold serves as a discharged condensate collecting pipe in which condensate is discharged through the multiple steam traps. The valve-member monitoring system further includes a sensor controlling terminal device that is attached to the manifold or in the vicinity of the manifold and exchanges information by radio with a central control apparatus. In the valve-member monitoring system, the terminal device is connected to the operating-condition sensors each attached to each of the steam traps installed on the manifold with lead lines. This reduces time and effort required to determine which operating-condition sensors are to be connected to the terminal device, and therefore facilitates the construction of the valve-member monitoring system, which are excellent results.

3 Claims, 4 Drawing Sheets

VALVE-MEMBER MONITORING SYSTEM

BACKGROUND OF THE INVENTION

1. Field of the Invention

The present invention relates to valve-member monitoring systems for monitoring the operating condition of valve members, which are represented by typical valves and steam traps, installed on fluid piping in factories, plants and other facilities and used in various applications. In particular, the present invention relates to a valve-member monitoring system including operating-condition sensors each attached to each of multiple valve members and a sensor controlling terminal device that exchanges information by radio with a central control apparatus and that is connected to the operating-condition sensors.

2. Description of the Related Art

A well-known valve-member monitoring system is disclosed in, for example, U.S. Pat. No. 6,145,529. This type of valve-member monitoring system requires a sensor controlling terminal device, which exchanges information by radio with a central control apparatus, to be connected with associated operating-condition sensors. This involves determining which operating-condition sensors are to be connected to the terminal device.

SUMMARY OF THE INVENTION

In the above-mentioned well-known valve-member monitoring system, the determination of which operating-condition sensors are to be connected to the terminal device needs to be made under consideration of the layout and distance between the terminal device and each operating-condition sensor, obstructions and some other factors, which requires considerable time and effort to make the determination.

Therefore, the present invention has been made to provide a valve-member monitoring system capable of effectively solving the above-mentioned problem by employing a rational structure.

For the purpose of solving the problem, a valve-member monitoring system according to an embodiment of the present invention includes operating-condition sensors each attached to each of multiple valve members installed on a manifold. The manifold serves as a discharged condensate collecting pipe in which condensate is discharged through multiple steam traps or serves as a fluid distribution pipe in which fluid is separated and delivered through multiple valves. The valve-member monitoring system further includes a sensor controlling terminal device that is attached to the manifold or is provided in the vicinity of the manifold and exchanges information by radio with a central control apparatus. In the valve-member monitoring system, the sensor controlling terminal device is connected to the operating-condition sensors each attached to each of the valve members installed on the manifold.

According to the present invention, the operating-condition sensors each attached to each of the valve members installed on the manifold are connected to the terminal device attached to the manifold or provided in the vicinity of the manifold, thereby reducing the time and effort required to determine which operating-condition sensors are to be connected to the terminal device and therefore facilitating the construction of the valve-member monitoring system, which are excellent results.

BRIEF DESCRIPTION OF THE DRAWINGS

Embodiments of the present invention will be described in detail based on the following figures, wherein.

DETAILED DESCRIPTION OF THE INVENTION

Figure 1:
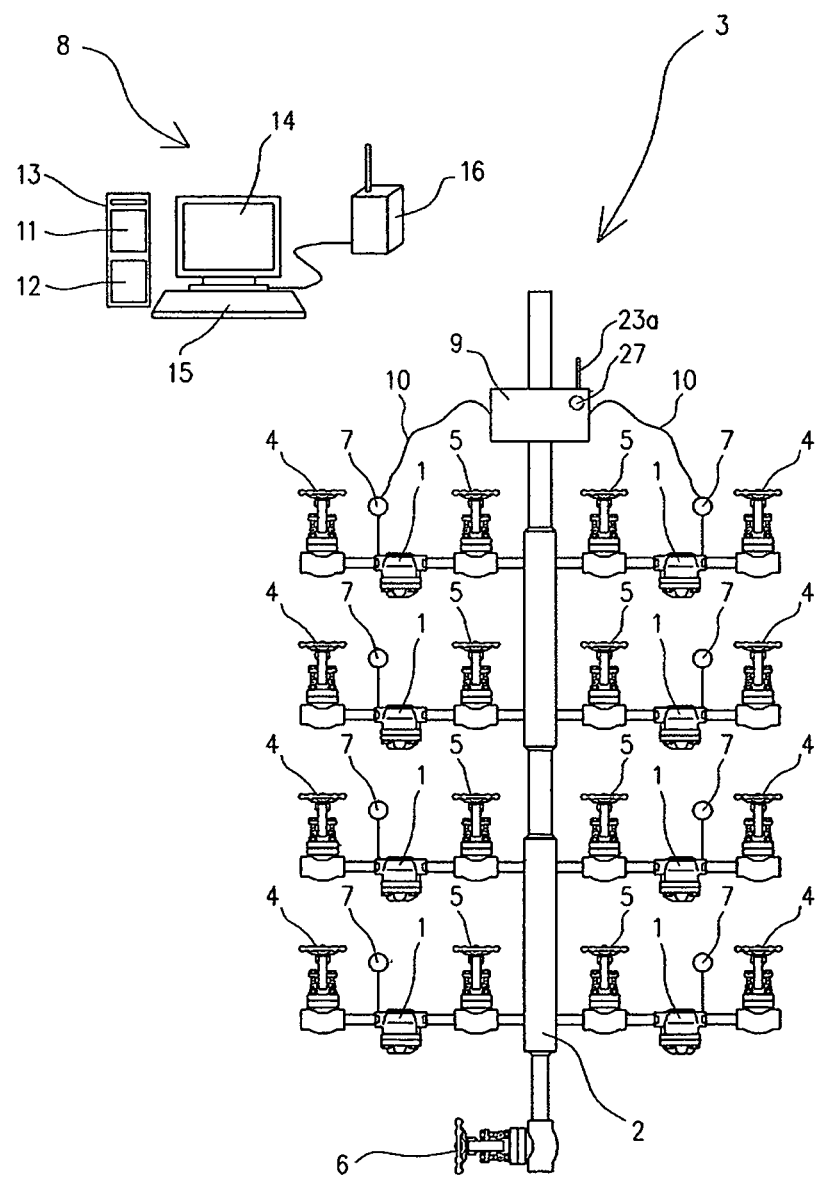
FIG. 1 is a schematic plan view showing an overview of a valve-member monitoring system according to an embodiment of the present invention.

An embodiment of the present invention will be described below by referring to FIGS. 1 to 4. FIG. 1 illustrates a monitoring system for monitoring the operating condition of multiple steam traps 1 installed on fluid piping in a factory, plant or another facility. A manifold 3 serves as a discharged condensate collecting pipe 2 in which condensate is discharged through the steam traps 1. The discharged condensate collecting pipe 2 has four condensate inlets on the left and right sides thereof, a condensate outlet at the top, and a blow port at the bottom. On each of the left and right condensate inlets, an inlet valve 4, a steam trap 1 and an outlet valve 5 are mounted from the upstream. A blowdown valve 6 is mounted on the blow port at the bottom of the pipe 2. The number of the condensate inlets is not limited to eight, so four, sixteen or a required number of condensate inlets can be provided. Attached to the entry port of each steam trap 1 is an operating-condition sensor 7, which may be a vibration sensor or temperature sensor, used for detecting the operating condition of the steam trap 1. At the upper part of the manifold 3, a sensor controlling terminal device 9, which exchanges information by radio with a central control apparatus 8, is secured with U bolts (not shown). The terminal device 9 can be also attached to an existing or newly-built structure, such as a column, in the vicinity of the manifold 3. The operating-condition sensors 7 each attached to the multiple steam traps 1 are connected to the terminal device 9 via lead lines 10 (In FIG. 1, the lead lines are shown only for the uppermost level, but not shown for the second to fourth levels).

Figure 2:
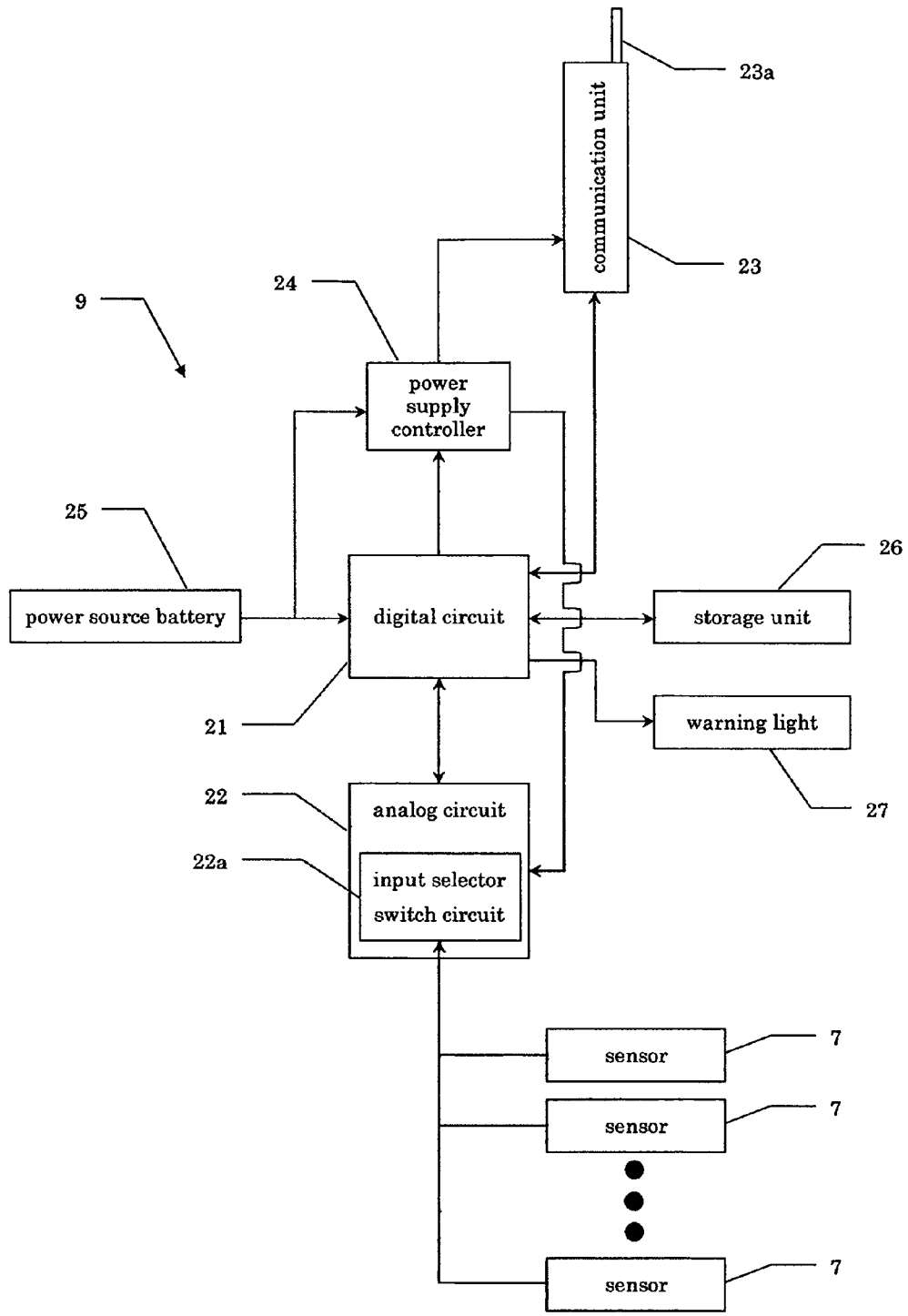
FIG. 2 is a block diagram showing the configuration of a terminal device according to the embodiment of the present invention.

The terminal device 9, as shown in FIG. 2, includes a digital circuit 21 using a microprocessor, an analog circuit 22 that has an input selector switch circuit 22a that successively inputs information detected by the sensors 7, a communication unit 23 that transmits and receives the information via an antenna 23a, a power supply controller 24 that controls electric power to be supplied to the analog circuit 22 and communication unit 23, a power source battery 25, a storage unit 26 that stores setting information and other type of information, and a warning light 27 using an LED. The digital circuit 21 in the terminal device 9 controls the power supply controller 24 to supply power to the analog circuit 22 at set time intervals or at a set time pursuant to setting information transmitted by radio from the central control apparatus 8 so as to activate the analog circuit 22 from a sleep mode to an active mode. The analog circuit 22 in the active mode inputs information detected by the multiple sensors 7 in succession. After the input process, the power supply controller 24 performs power supply control to return the analog circuit 22 to sleep mode. The input information detected by the sensors is processed in the digital circuit 21. Subsequent to the input process of the information detected by the sensors, the digital circuit 21 of the terminal device 9, in the same manner, controls the power supply controller 24 to supply power to the communication unit 23 so as to activate the communication unit 23 from sleep mode to active mode. The communication unit in the active mode transmits the information, which was detected by the sensors and was processed in the digital circuit 21, to the central control apparatus 8 as well as receives instruction information from the central control apparatus 8. Subsequent to the transmission/receipt process, the power supply controller 24 performs power supply control to return the communication unit 23 to sleep mode.

When the digital circuit 21 of the terminal device 9 has received a signal from the central control apparatus 8 while the communication unit 23 is in the sleep mode, the digital circuit 21 temporarily puts the communication unit 23 into active mode to receive the signal. In addition, the digital circuit 21 of the terminal device 9 keeps track of the output voltage of the power source battery 25 and the strength of signals received by the communication unit 23, while making a function check of the multiple sensors 7 and each component in the terminal device 9 in accordance with instructions from the central control apparatus 8. When the output voltage of the power source battery 25 is decreased below a set value, the strength of the received signal is decreased below a set value, or a malfunction is detected in the function check of the multiple sensors 7 and components in the terminal device, the digital circuit 21 transmits an anomaly signal to the central control apparatus 8 and flashes a warning light 27 to report the anomaly. Note that the terminal device 9 is operable by not only the power source battery 25, but also a utility power source, non-utility power source and auxiliary power source such as solar batteries.

The central control apparatus 8, as shown in FIG. 1, includes a personal computer 13 having a processing controller 11 using a microprocessor and a storage unit 12 using a hard disc or the like, a display monitor 14, a peripheral device such as a keyboard 15, and a wireless modem 16 connected thereto. The central control apparatus 8 performs radio communications with the terminal device 9 through the wireless modem 16. The processing controller 11 of the central control apparatus 8 diagnoses the operating condition of each steam trap 1 based on the above-described sensor-detected information transmitted from the terminal device 9, displays the diagnosed results on the display monitor 14, stores the results in the storage unit 12, and instructs the terminal device 9 through radio communications to flash the warning light 27. When the processing controller 11 of the central control apparatus 8 has received an anomaly signal about the aforementioned malfunctions and signal strength reduction from the terminal device 9, the processing controller 11 displays the anomaly information on the display monitor 14 and stores it in the storage unit 12. The storage unit 12 of the central control apparatus 8 has a program therein that allows the processing controller 11 to perform the above processes including communications using the wireless modem 16.

Figure 3:
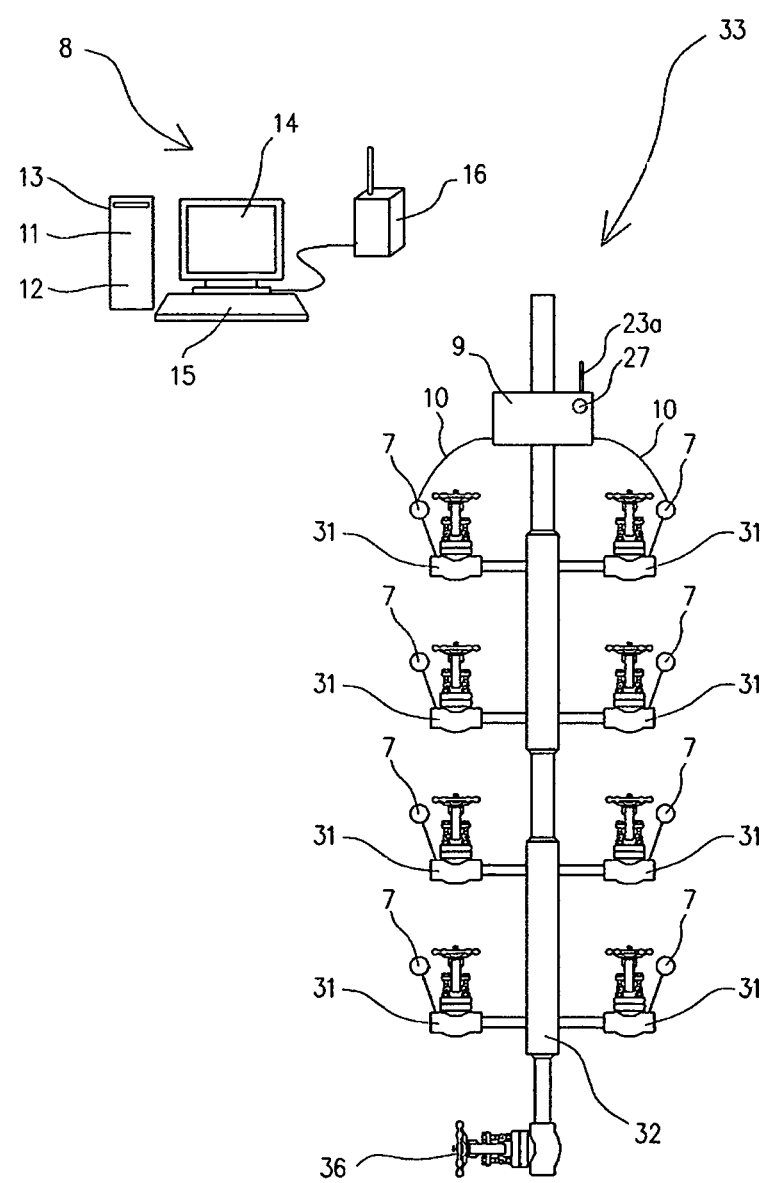
FIG. 3 is a schematic plan view showing an overview of a valve-member monitoring system of another embodiment of the present invention.

FIG. 3 shows a monitoring system, according to another embodiment of the present invention, that monitors the operating condition of multiple valves 31 installed on fluid piping in a factory, plant or another facility. A manifold 33 serves as a fluid distribution pipe 32 in which fluid is separated and delivered through the valves 31. The fluid distribution pipe 32 has four steam outlets on the left and right sides thereof, a steam inlet at the top, and a blow port at the bottom. On each of the left and right steam outlets, a valve 31 is mounted. A blowdown valve 36 is mounted on the blow port at the bottom of the pipe 32. The number of the steam outlets is not limited to eight, sixteen or a required number of steam outlets can be provided. Attached to the exit port of each valve 31 is an operating-condition sensor 7, which may be a vibration sensor or temperature sensor, used for detecting the operating condition of the valve 31. At the upper part of the manifold 33, a sensor controlling terminal device 9, which exchanges information by radio with a central control apparatus 8, is secured with U bolts (not shown). The terminal device 9 can be also attached to an existing or a newly-built structure, such as a column, in the vicinity of the manifold 33. The operating-condition sensors 7 each attached to the multiple valves 31 are connected to the terminal device 9 via lead lines 10 (In FIG. 3, the lead lines are shown only for the uppermost level, but not shown for the second to fourth levels).

Figure 4:
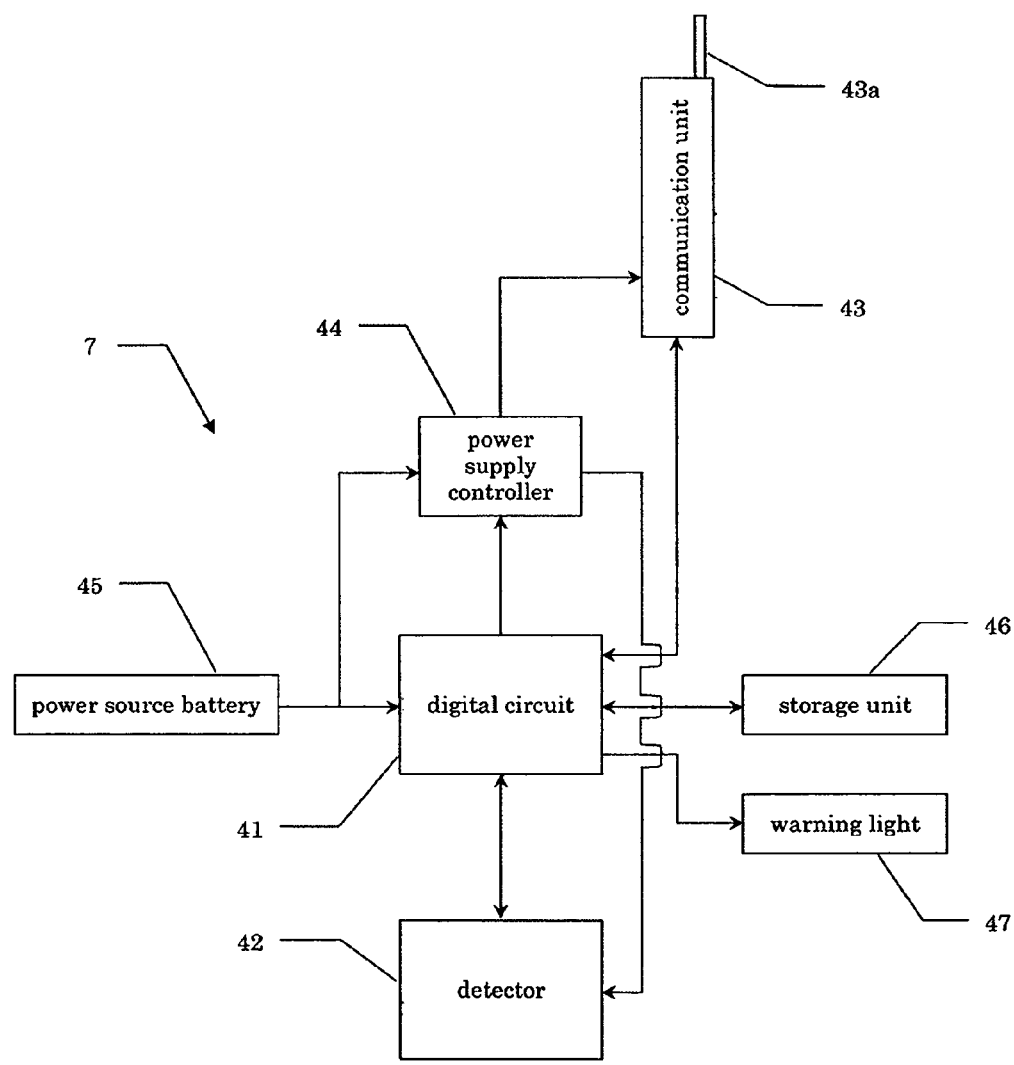
FIG. 4 is a block diagram showing the configuration of a sensor according to the embodiment of the present invention.

Although the sensors 7 are connected to the terminal device 9 with lead lines 10 in the aforementioned embodiment, radio communication is available to connect the terminal device 9 and sensors 7. Each sensor 7 with radio communication capability, as shown in FIG. 4, includes a digital circuit 41 using a microprocessor, a detector 42 that detects the operating condition of the valve 31, a communication unit 43 that transmits and receives information via an antenna 43a, a power supply controller 44 that controls the supply of electric power to the detector 42 and communication unit 43, a power source battery 45, a storage unit 46 that stores setting information and other types of information, and a warning light 47 using an LED. The terminal device 9 includes the same components shown in FIG. 2 except for the analog circuit 22 and sensors 7. The digital circuit 41 of the sensor 7 that is connected to the terminal device 9 by radio, controls the power supply controller 44 at set time intervals or at a set time pursuant to the setting information transmitted by radio from the central control apparatus 8 so as to activate the detector 42 and communication unit 43 from sleep mode to active mode. The detector 42 in the active mode detects the operating condition of the steam trap 1 or valve 31 and the communication unit 43 in the active mode transmits the detected information to the terminal device 9. Subsequent to the transmission process, the power supply controller 44 performs power supply control to return the detector 42 and communication unit 43 to sleep mode. When the communication unit 43 has received a signal from the central control apparatus 8 during sleep mode, the digital circuit 41 of the sensor 7 temporarily puts the communication unit 43 into active mode to receive the signal. In addition, the digital circuit 41 of the sensor 7 keeps track of the output voltage of the power source battery 45 and the strength of signals received by the communication unit 43, while making a function check of components in the sensors in accordance with instructions from the central control apparatus 8. When the output voltage of the power source battery 45 is decreased below a set value, the strength of the received signal is decreased below a set value, or a malfunction is detected in the function check of the sensor components, the digital circuit 41 transmits an anomaly signal to the central control apparatus 8 and flashes a warning light 47 to report the anomaly. Note that the sensors 7 are operable by not only the power source battery 45, but also a utility power source, non-utility power source and auxiliary power source such as solar batteries.

The embodiments of the present invention can be applied to a valve-member monitoring system in which an operating-condition sensor is attached to each of multiple valves installed on fluid piping in factories, plants and other facilities and the plurality of operating-condition sensors are connected to a sensor controlling terminal device capable of exchanging information by radio with a central control apparatus.

It should be understood by those skilled in the art that various modifications, combinations, sub-combinations and alterations may occur depending on design requirements and other factors insofar as they are within the scope of the appended claims or the equivalents thereof.

What is claimed is:

1. A valve-member monitoring system that monitors operating conditions of a plurality of valve members comprising:
   operating-condition sensors each attached to each of the plurality of valve members installed on a manifold, the manifold serving as a discharged condensate collecting pipe in which condensate is discharged through a plurality of steam traps or the manifold serving as a fluid distribution pipe in which fluid is separated and delivered through a plurality of valves; and
   a sensor controlling terminal device that is attached to the manifold or provided in the vicinity of the manifold such that the sensor controlling terminal device is proximate to each of the plurality of valve members and exchanges information by radio with a central control apparatus,
   wherein the sensor controlling terminal device is directly connected to but physically separate from the operating-condition sensors each attached to each of the plurality of valve members installed on the manifold,
   wherein the sensor controlling terminal device is arranged above each of the plurality of valve members installed on the manifold and each of the operating-condition sensors attached to each of the plurality of valve members installed on the manifold.

2. The valve-member monitoring system recited in claim 1, wherein the operating-condition sensors are at least one of (i) temperature and (ii) vibration sensors.

3. The valve-member monitoring system recited in claim 1, wherein a distance from the sensor controlling terminal device to a valve member of the plurality of valve members is approximate to a distance from the valve member to an operating-condition sensor of the operating-condition sensors.

* * * * *